June 7, 1927.

E. L. VICARS 1,631,441

BISCUIT MAKING AND THE LIKE MACHINE

Filed Nov. 13, 1925     2 Sheets-Sheet 1

Witnesses.

Inventor

Edward Lynton Vicars
By Dowell & Dowell
his Attorneys

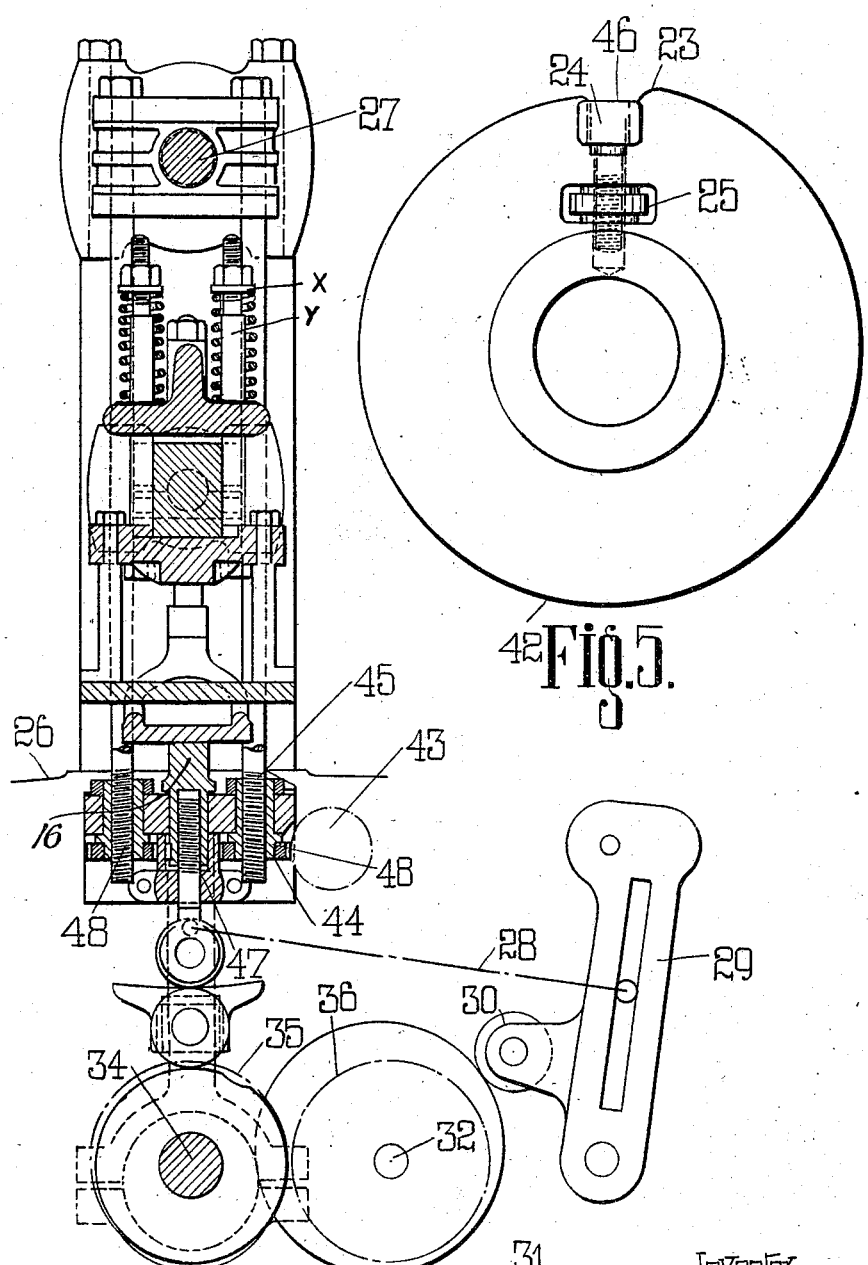

Patented June 7, 1927.

1,631,441

UNITED STATES PATENT OFFICE.

EDWARD LYNTON VICARS, OF EARLESTOWN, ENGLAND.

BISCUIT-MAKING AND THE LIKE MACHINE.

Application filed November 13, 1925, Serial No. 68,832, and in Great Britain December 13, 1924.

The present invention relates to improvements in biscuit making and the like machinery of the type in which biscuits are cut from a sheet of dough and have an impression made upon them by means of an embossing die.

Heretofore, when dough pieces have been embossed from a dough sheet previous to cutting, it has been found that the dough is apt to flow or spread beyond the diameter of the cutters, thereby thinning the biscuits and making them of irregular shape.

The difficulty is also present in certain cases, that the dough is apt to stick to the embossing tool.

According to the present invention a cutter for biscuits and a biscuit embossing tool are arranged concentric with one another and are given a differential motion so that at certain times the cutting tool will move in advance or recede relatively to the embossing tool.

The cutting tool in its initial depression upon the dough is arranged to cut only slightly into the dough and not entirely through it, thus limiting the line of flow or spread of the dough when the latter is subjected to the action of the embossing tool which moves down upon the surface of the piece of dough lying within the cutting tool.

The invention is more particularly described with reference to the accompanying drawings, in which:

Figure 4 is a modified form of construction in sectional elevation, in which the movement of the dough is continuous and in which therefore, the cutting and embossing tools during the cutting and embossing operations move linearly with the dough.

Figure 5 is the detail view of the cam, having means to adjust the same to allow dough of various thicknesses to be cut by the method according to the invention.

Figure 1:
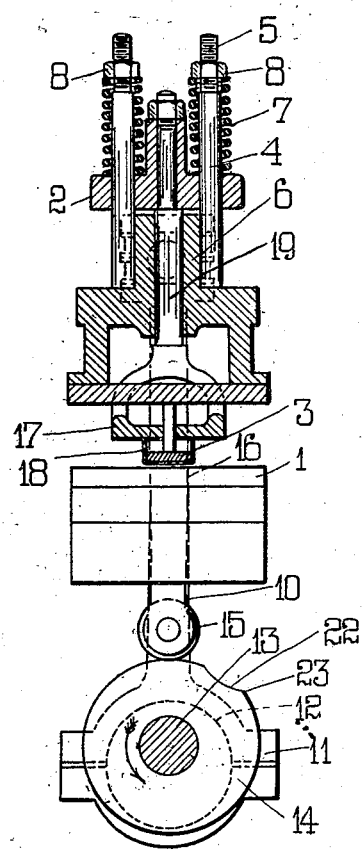
Figure 1 shows the driving mechanism for cutting and embossing tools partially in section.
Figure 2:
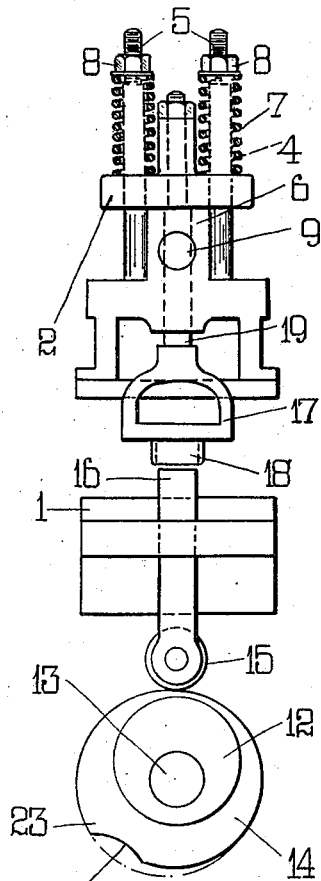
Figure 2 is an outside view corresponding to Fig. 1 with the parts somewhat displaced from the position shown in Fig. 1.

In the arrangement shown with reference to the Figs. 1 and 2 of the drawings, a sheet of dough is moved or displaced step by step over a cutting table 1, over which is mounted a cross-head 6 carrying embossing tools 3. This cross-head 6 has spindles 4 attached to it while compression springs 7 are arranged between the threaded ends 5 of said spindles 4 and a cross-head 2. Nuts 8 allow for the degree of compression of the spring 7 to be varied. The cross-head 6 has a journal 9 on which can freely swing a connecting-rod 10, bearing at its other end an eccentric sheath 11 operated by an eccentric 12 keyed to the main driving shaft 13. On the same shaft 13 is keyed an eccentric cam 14 upon which rolls a roller 15 carrying a stop 16 moving in guides in the table 1. This stop abuts against a cutter block 17 carrying the cutter 18, which block 17 is mounted on spindles 19 secured upon the cross-head 2. It will consequently be seen that the cycle of operations will follow that diagrammatically illustrated in Figure 3, viz. the cutters 18 and concentric internal embossing tools 3 will descend together with the embossing tool in a receded position within and shrouded by the cutters 18 until the cutters move partially into the dough, as shown at A, Fig. 3, but the cutters will not at this stage descend entirely through the dough as the cutter block 17 will be arrested in its downward motion by the stop 16, whilst the embossing tools 3 move on against the compressing action of the springs 7 by reason of the eccentric 12 to emboss the portion of dough confined within the cutter, as shown at B, allowing a limited flow or spread of the dough underneath the lower edge of the cutter. This has been found to be a particularly advantageous precaution in practice, as the limited passage for any outward flow or spread of the dough allows a greater pressure to be exerted on the dough which is consequently forced upwardly into or against the engraving on the embossing tools. The consequence of this mechanism is that the cut dough biscuit 20 will usually be of slightly greater thickness than the thickness of the dough sheet 21.

Figure 3:
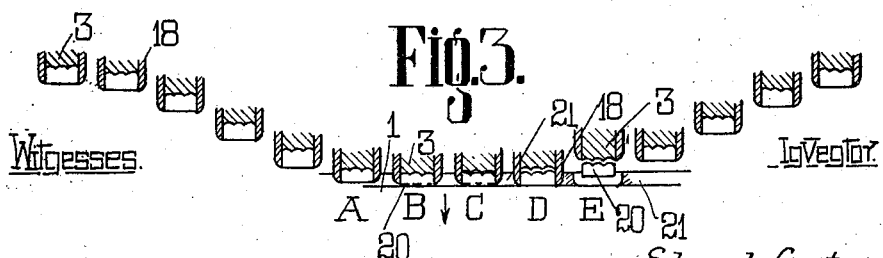
Figure 3 is a diagrammatic view showing the cycle of movement of the cutting and embossing tools.

When the embossing tool has completed the embossing operation, as shown at B, Fig. 3, the eccentric 12 commences to allow the embossing tools to return or recede as shown about C, and about this moment the roller 15 will drop into the gap 22 in the cam 14 to allow the cutters 18 to pass entirely through and sever the biscuit completely from the sheet of dough 21, as shown at D, (Fig. 3), thus effecting the severance operation substantially simultaneously with the completion of the impression operation. It will be observed that the cutting tool completes its severance operation while the embossing tool is receding or returning to starting position.

Whilst the embossing tool 3 is steadily receding, the cutters 18 will be moved back retracted at a quicker speed owing to the hump 23 on the cam 14, and this differential motion will cause the biscuit 20, which might otherwise have a tendency to stick within the cutters 18, to be effectively ejected therefrom, as shown at E, (Fig. 3). The cutter and embossing tools then move clear of the dough sheet 21, which may be moved on to bring a fresh portion of the dough sheet below these tools for the next stroke or cycle of operation.

It will be preferred to use, instead of the cam 14, as shown in Figs. 1 and 2, a cam such as shown in Fig. 5 in which a cam disc 42 has a gap 46 with an adjustable stop 24 mounted on a threaded spindle controlled by an operating head 25, so that the gap between the cutters and the cutting table, whilst the dough is being embossed, as fixed by the stop 16 can be adjusted to suit various thicknesses of dough.

Means may be provided if desired, for adjusting the height of the cutting table relatively to the cutters to suit slight variations in the height thereof.

For example, if the depth of the cutters varies through the edges losing their sharpness and are resharpened the stop 16 may be adjusted relatively to the table by means of a threaded spindle 47 (see Fig. 4).

If it is desired to vary the thickness of the biscuit, the whole of the table may be raised or lowered as required by means of threaded spindles 48, the guides Y being movable or raised with the cross-head to engage against the washers X to act as a stop.

Mechanism for accomplishing such an adjustment may comprise a worm wheel, such as 43, Fig. 4, and driving pinions 44 carried on sleeves 45 threaded onto the spindles 48 which support the cutting table 26.

In the arrangement shown in Fig. 4, the cutting table 26 with cross-head and associated elements are adapted to swing about a shaft 27 by means of a connecting rod 28 on a crank arm 29, so that cutting and embossing can proceed whilst the dough is moving continuously forward.

This crank arm 29 has a roller 30 thereon operated from the cam 31 on a shaft 32 driven from the main shaft 34 by means of toothed gearing 35 and 36. The cycle of operations of the cutter and embossing tool in such an arrangement will be similar to that described in Figs. 1, 2 and 3.

I declare that what I claim is:—

1. A biscuit-making machine comprising in combination, means for supporting a sheet of dough, cutters adapted to act on the dough, embossing tools disposed within said cutters and adapted also to act on the dough, means for moving the cutters initially only partially into the dough clear of the supporting means therefor to incompletely sever the dough, means for moving the embossing tools toward the dough while the cutters are moved into partial severance thereof and to thereafter effect an impression upon the portions of the dough held partially severed by the cutters while severance movement of the latter is temporarily interrupted, means for thereafter effecting a further movement of the cutters to completely sever the previously partially severed portions of the dough while gradually retracting the embossing tools therefrom, and means for retracting the cutters at a differential speed with the embossing tools to overtake and uncover the latter as said elements are moved away from the supporting means for the dough and cause the release or ejection of the embossed and severed portions of the dough from the cutters.

2. A biscuit-making machine comprising in combination, means for supporting a sheet of dough, cutters adapted to act on the dough, embossing tools disposed within said cutters and adapted also to act on the dough, means for moving the cutters initially only partially into the dough clear of the supporting means therefor to incompletely sever the dough, means for moving the embossing tools toward the dough while the cutters are moved into partial severance thereof and to thereafter effect an impression upon the portions of the dough held partially severed by the cutters while severance movement of the latter is temporarily interrupted, means for thereafter effecting a further movement of the cutters to completely sever the previously partially severed portions of the dough while gradually retracting the embossing tools therefrom, and means for retracting the cutters at a differential speed with the embossing tools to overtake and uncover the latter as said elements are simultaneously moved away from the supporting means for the dough, together with means for adjusting the depth of the cutting tools previous to the action of the embossing tools.

In witness whereof, I have hereunto signed my name this 2nd day of November 1925.

EDWARD LYNTON VICARS.